United States Patent
Scoleri et al.

(10) Patent No.: US 8,180,496 B2
(45) Date of Patent: May 15, 2012

(54) SYSTEM AND METHOD OF CONSTANT PRESSURE, VARIABLE SPEED PUMP CONTROL WITH LOCAL EQUALIZATION FOR DISSIMILAR PUMPS

(75) Inventors: Michael Scoleri, Calumet City, IL (US); Richard Potter, Winfield, IL (US)

(73) Assignee: Metropolitan Industries, Inc., Romeoville, IL (US)

( * ) Notice: Subject to any disclaimer, the term of this patent is extended or adjusted under 35 U.S.C. 154(b) by 741 days.

(21) Appl. No.: 12/398,650

(22) Filed: Mar. 5, 2009

(65) Prior Publication Data
US 2009/0287357 A1    Nov. 19, 2009

Related U.S. Application Data

(60) Provisional application No. 61/034,076, filed on Mar. 5, 2008.

(51) Int. Cl.
*G05D 7/00* (2006.01)
*F04B 41/06* (2006.01)

(52) U.S. Cl. .......................................... 700/282; 417/2
(58) Field of Classification Search .................. 700/282, 700/301; 417/2
See application file for complete search history.

(56) References Cited

U.S. PATENT DOCUMENTS

| | | | | |
|---|---|---|---|---|
| 3,974,716 | A * | 8/1976 | Henkel et al. | 74/661 |
| 6,170,261 | B1 * | 1/2001 | Ishizaki et al. | 60/421 |
| 6,185,946 | B1 * | 2/2001 | Hartman | 62/175 |
| 2004/0193330 | A1 * | 9/2004 | Mehaffey et al. | 700/301 |
| 2008/0288115 | A1 * | 11/2008 | Rusnak et al. | 700/282 |
| 2009/0304521 | A1 * | 12/2009 | Kernan et al. | 417/2 |

* cited by examiner

*Primary Examiner* — Ryan Jarrett
(74) *Attorney, Agent, or Firm* — Husch Blackwell LLP

(57) ABSTRACT

A pump control system includes a plurality of different variable speed pumps. Each of the pumps can be operated at a different speed to equalize pump loads. A system wide proportional integral differential control loop increases and decreases the speed of all pump motors to maintain a desired system output pressure. A second proportional integral differential control loop associated with each pump adjusts pump speed to equalize a load profile for each respective pump.

18 Claims, 3 Drawing Sheets

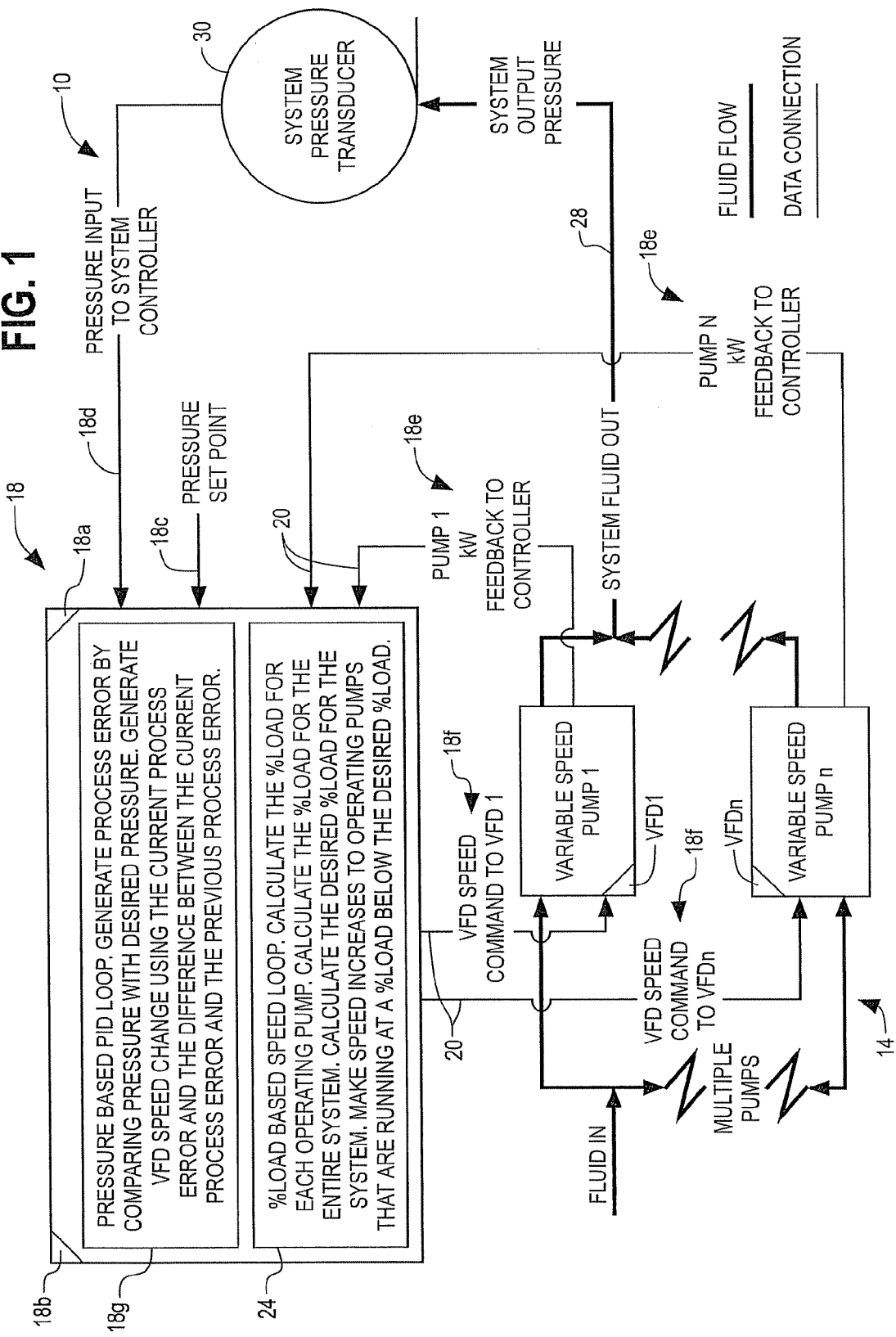

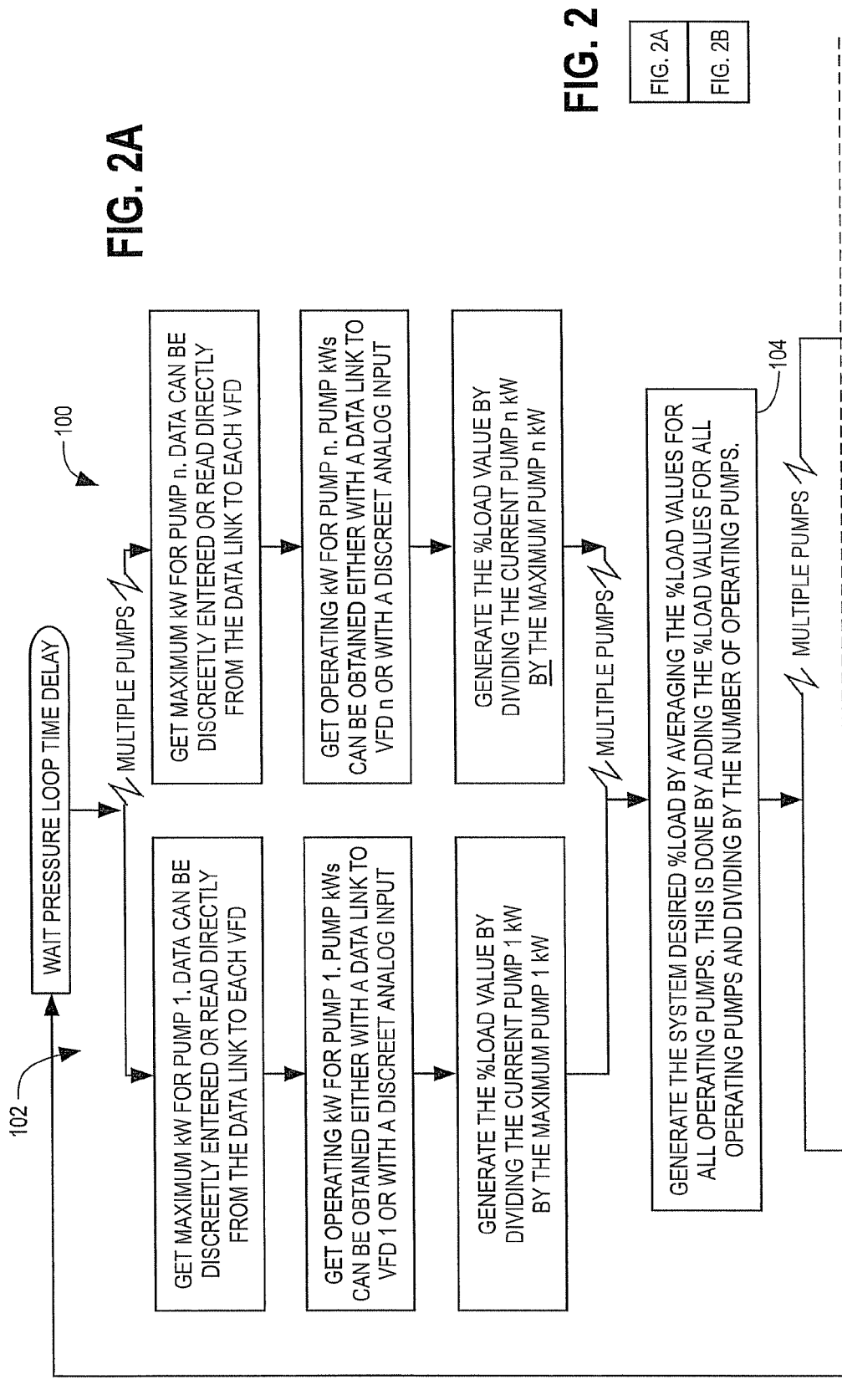

SYSTEM AND METHOD OF CONSTANT PRESSURE, VARIABLE SPEED PUMP CONTROL WITH LOCAL EQUALIZATION FOR DISSIMILAR PUMPS

CROSS-REFERENCE TO RELATED APPLICATION

This application claims the benefit of the filing date of U.S. Provisional Application No. 61/034,076 filed Mar. 5, 2008 and entitled "Constant Pressure Variable Speed Pump Control System with Load Equalization for Dissimilar Pumps" which is also incorporated herein by reference.

FIELD

The invention pertains to systems and methods of control of variable speed pumps. More particularly, the invention pertains to such systems and methods which take into account characteristics of dissimilar pumps.

BACKGROUND

Variable speed pumping systems vary the speed of the pumps using variable frequency drives to maintain a constant system pressure. Where multiple pumps are required to maintain the desired pressure, pumps with dissimilar pumping and load curves can experience an undesirable imbalance in the demand made on each pump to maintain the desired pressure if all pumps operate at the same speed. It would be desirable to be able to dynamically equalize load profile for all operating pumps while at the same time maintaining system pressure.

BRIEF DESCRIPTION OF THE DRAWINGS

FIG. 1 is a block diagram of a system which embodies the invention; and

DETAILED DESCRIPTION

Figure 2B:
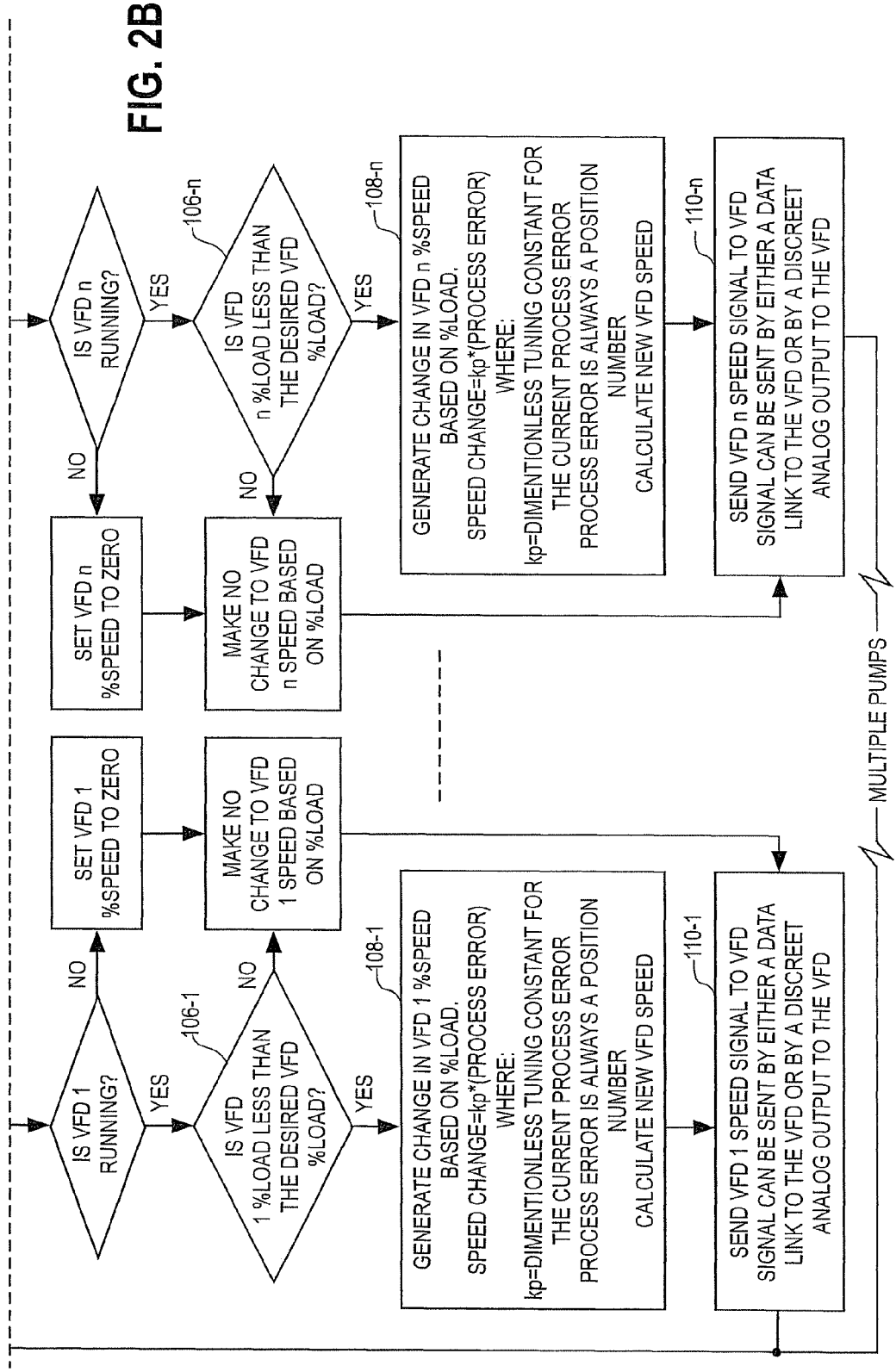
FIG. 2 is a flow diagram illustrating aspects of a method that embodies the invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

Embodiments of the invention adjust the speed of all operating pumps based on desired system pressure while equalizing load profile for all operating pumps. While operating, variable frequency drives sense various parameters such as operating frequency, current and voltage. Such data is available to embodiments of the invention in analog or digital form.

Data can be acquired from displaced pumps via a data link, such as a serial data link implemented using a publicly available telecommunications system, or via a computer network, for example the Internet. In an aspect of the invention, a determination can be made as to the load on the variable frequency drive, hence the load on the pump. The current load for each pump of interest can be established and compared with the maximum load for that particular pump. The percent of full load at which that particular unit is operating can be established for each member of the plurality of operating pumps.

In a disclosed embodiment of the invention, an average percent of full load is established based on characteristics of all members of the plurality of operating pumps. If a selected pump has a load that is below the average for all operating pumps, then the speed of that pump can be increased. If a selected pump has a load that exceeds the average, the speed of that pump would not be increased. If desired, a speed required parameter, or set point, can be established for each member of the plurality of pumps.

An embodiment of the invention can incorporate several proportional, integral, differential (PID) control loops. A primary PID loop processes speed required control outputs for all pump motors in a system. This loop will increase or decrease the speed of all pump motors to maintain a desired system fluid pressure output. Each of the operating pumps and associated driving motor contribute to output flow and pressure. The primary loop has a shorter response time than other control loops operating in the system.

A secondary PID control loop is associated with each of the operating pumps in the system. This control loop generates a speed required control output for the respective drive/pump motor. This control loop increases the speed of the respective motor to track the average percent of load value that is generated from data received from all active drive/pump motor combinations in the system. The members of the plurality of pump specific PID loops each has a longer response time than does the primary control loop noted previously.

FIGS. 1, 2 illustrate various aspects of systems and methods in accordance with the invention. A system 10 includes a plurality of variable speed pump units 14. Members of the plurality 14 are coupled to and in communication with system control circuits 18. Communication between members of plurality 14 and control circuits 18 can be by hard wiring, modems and wired or wireless switched telephone networks, or by computer based networks such as intranets or the Internet, generally indicated at 20. The details of such communications are not limitations of the invention.

Control circuits 18 can be implemented with one or more programmable processors, such as 18a, and associated executable control software 18b, stored on a computer readable medium. Inputs to circuits 18 can include a system pressure setpoint 18c, a feedback pressure indicator 18d and one or more feedback parameters 18e from members of the plurality 14. Control circuits 18 can output pump speed setpoints, indicated generally at 18f, for each of the members of the plurality 14.

In the disclosed embodiment, each of the members of the plurality, such as 14n include a variable frequency drive, such as VFDn, and an associated pump Pn. A pump PID feedback loop, implemented in control circuits 18 is indicated generally at 24. It will be understood that speed control systems different than variable frequency drives also come within the spirit and scope of the invention.

Outputs from the pumps Pi are combined and coupled to a system fluid output conduit such as conduit 28. System pressure can be sensed at a pressure sensor 30 and a signal indicative thereof 18d can be coupled to the control circuits 18. A pressure based PID loop 18g can be implemented in control circuits 18.

FIG. 2 illustrates aspects of a system pressure control method 100 which embodies the invention. As illustrated at 102, on a per-pump basis, actual percent load values for each pump P1 . . . Pn can be determined by control circuits 18. As at 104, a system average desired percent load can be established.

As illustrated at 106-i, for each operating pump, actual VFD percent load can be compared to average, desired VFD percent load. Where actual VFD percent load is less than the desired average, speed at the respective pump Pi can be increased by first producing a new speed parameter or indicium as at 108-i. As at 110-i, that updated value can be sent via communications link 20 to the respective variable speed pump Pi.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A constant pressure pump control system comprising:
a plurality of variable speed pump control units; and
control circuits coupled to the units, the control circuits acquire parametric information associated with operational characteristics of each unit, the control circuits establish a system average percent load parameter associated with all of the units, the control circuits compare a local load parameter, for each pump, to the system average load parameter, and, responsive thereto, establish a respective speed parameter for at least some of the units.

2. A system as in claim 1 which includes a plurality wide proportional, integral, differential control loop which responds to at least one selected plurality wide parameter, the plurality wide control loop has an associated response time.

3. A system as in claim 2 which includes other proportional, integral, differential control loops associated each member of the plurality, the other control loops each have an associated response time.

4. A system as in claim 3 where the response time of the plurality wide control loop is shorter than the response time of the other control loops.

5. A system as in claim 4 where in response to the comparison, a speed parameter of at least one of the respective units is increased.

6. A system as in claim 1 where in response to the comparison, a speed parameter of at least one of the respective units is increased.

7. A system as in claim 1 which includes circuitry to transmit at least one speed parameter to the respective unit.

8. A control system comprising:
a plurality of pumps where each pump has an associated speed control unit;
control circuits coupled to each of the speed control units; and
a fluid pressure sensor coupled in the control circuits, the control circuits maintain a desired pressure indicator, where the control circuits establish a system average percent load parameter associated with all of the units, the control circuits compare a local load parameter, for each pump, to the system average load parameter, and, responsive thereto, establish a respective speed parameter for at least some of the units.

9. A control system as in claim 8 where the control circuits forward speed parameters for some of the pumps to the respective speed control units.

10. A control system as in claim 9 where the speed parameters increase output speed of the respective control unit and pump.

11. A method comprising:
establishing a plurality of pumps where some of the pumps have different operating parameters than others;
establishing a preferred fluid pressure;
determining a pump load parameter for each of the pumps; and
comparing the pump load parameter for each of the pumps with a plurality average load parameter, and, responsive thereto, adjusting a speed parameter of at least some of the pumps.

12. A method as in claim 11 which includes providing closed loop control signals with each of the local signals associated with one member of the plurality.

13. A method as in claim 11 which includes processing parametric feedback information from each member of the plurality with an associated control loop.

14. A method as in claim 11 which includes, evaluating at least one performance parameter for each member of the plurality, and responsive thereto establishing the plurality average load parameter.

15. A method as in claim 11 which includes monitoring the fluid pressure and responsive to variations from the preferred fluid pressure, adjusting a speed parameter of at least some members of the plurality.

16. A system for control of a plurality of pumps where each pump has an associated speed control unit comprising:
control circuits coupled to each of the speed control units; and
a fluid pressure sensor coupled in the control circuits, the control circuits maintain a desired pressure indicator, where the control circuits implement at least one proportional integral differential feedback control function to establish a system average percent load parameter associated with all of the speed control units, the control circuits compare a local load parameter, for each pump, to the system average load parameter, and, responsive thereto, establish a respective speed parameter for at least some of the units.

17. A system as in claim 16 where the control circuits implement at least two different proportional integral differential feedback control functions.

18. A system as in claim 17 where the control circuits transmit speed parameters to respective speed control units.

* * * * *